United States Patent [19]

Lee

[11] Patent Number: 5,900,717
[45] Date of Patent: May 4, 1999

[54] RECHARGEABLE BATTERY CHARGING CIRCUIT

[75] Inventor: Chang-Hum Lee, Anyang, Rep. of Korea

[73] Assignee: SamSung Electronics Co., Ltd., Suwon, Rep. of Korea

[21] Appl. No.: 08/950,101

[22] Filed: Oct. 14, 1997

[30] Foreign Application Priority Data

Oct. 12, 1996 [KR] Rep. of Korea ............... 96-45546

[51] Int. Cl.$^6$ ...................................... H02J 7/02
[52] U.S. Cl. ........................................ 320/150; 320/153
[58] Field of Search ........................... 320/124, 125, 320/132, 144, 150, 151, 152, 153, 160, FOR 118, FOR 120, FOR 121, FOR 122, FOR 134, FOR 138

[56] References Cited

U.S. PATENT DOCUMENTS

| | | |
|---|---|---|
| 4,843,299 | 6/1989 | Hutchings . |
| 5,049,804 | 9/1991 | Hutchings . |
| 5,055,763 | 10/1991 | Johnson et al. . |
| 5,166,596 | 11/1992 | Goedken ................... 320/150 |
| 5,168,205 | 12/1992 | Kan . |
| 5,175,485 | 12/1992 | Joo . |
| 5,241,259 | 8/1993 | Patino et al. . |
| 5,411,816 | 5/1995 | Patino et al. . |
| 5,479,083 | 12/1995 | Brainard . |
| 5,483,145 | 1/1996 | Shiojima et al. ................ 320/150 |
| 5,497,068 | 3/1996 | Shiojima ................... 320/150 |
| 5,541,492 | 7/1996 | Fernandez et al. . |
| 5,561,361 | 10/1996 | Sengupta et al. . |
| 5,568,040 | 10/1996 | Krainer et al. . |
| 5,592,069 | 1/1997 | Dias et al. . |
| 5,592,070 | 1/1997 | Mino . |
| 5,617,009 | 4/1997 | Takao et al. . |
| 5,637,981 | 6/1997 | Nagai et al. . |

*Primary Examiner*—Edward H. Tso
*Attorney, Agent, or Firm*—Robert E. Bushnell, Esq.

[57] ABSTRACT

A rechargeable battery charging circuit comprises a detection circuit for detecting the ambient temperature and a charging current control circuit for controlling the charging current in dependence upon the ambient temperature. The battery charging circuit charges the battery in response to the ambient temperature variations in order to maximize the charging efficiency of the battery at temperatures higher than room temperature.

22 Claims, 4 Drawing Sheets

RECHARGEABLE BATTERY CHARGING CIRCUIT

CLAIM FOR PRIORITY

This application makes reference to, incorporates the same herein, and claims all benefits accruing under 35 U.S.C. §119 from an application for RECHARGEABLE BATTERY CHARGING CIRCUIT earlier filed in the Korean Industrial Property Office on the 12$^{th}$ of October 1996 and there duly assigned Ser. No. 45546/1996, a copy of which application is annexed hereto.

BACKGROUND OF THE INVENTION

Technical Field

The present invention relates to a battery charging circuit and, more particularly, relates to a battery charging circuit to charge secondary or rechargeable batteries which provide electrical power to portable devices such as personal computers, radios, radiophones, wordprocessors, and a variety of portable handsets.

Related Art

Generally, batteries are used to supply power to portable devices such as personal computers, radios, radiophones, stereo cassette tape players etc. Such batteries are typically available in two different types such as those characterized as rechargeable or non-rechargeable and exhibit different end of life voltage characteristics and effective series resistances. Nonrechargeable battery types are those ordinary alkaline batteries that should not be subjected to recharging attempts. Rechargeable battery types are those nickel-cadmium (Ni-Cd), nickel-hydrogen (Ni-H) and recently developed nickel metal-hydride (Ni-MH) batteries that should be charged at different rates with different conditions.

When a rechargeable battery is used as a power supply system for portable personal computers as disclosed, for example, in U.S. Pat. No. 5,561,361 for *Computer Power Supply And Battery Recharging System* issued to Sengupta et al., the battery may be charged by battery charger in two different charging modes, that is, a run and charging mode and a run or charging mode. During the run and charging mode, the battery is charged regardless of whether the computer is operating or not, and as a result, the charging operation may be difficult to control. In contrast to the run and charging mode, the run or charging mode allows the battery to be charged selectively depending upon whether the computer is operating or not.

Generally, charging operations of such a battery may be classified into four fixed modes, that is, a fast or rapid charging, a quick charging, a standard charging and a trickle charging, in relation with charging capacities or charging current of the battery. In the fast charge mode, a relatively larger charging current (e.g., about 2 amperes or so) is applied to a battery over a relatively still shorter period of time, for example one to two hours. In the quick charge mode, a relatively large charging current (e.g., about 1 ampere to high hundreds of milliamperes or so) is applied to the battery over a relatively shorter period of time, for example four to six hours. In the standard charge mode, a relatively smaller charging current (e.g., about low hundreds of milliamperes or so) is applied to the battery over a relatively longer period of time, for example eight to ten hours. In the trickle charge mode, the battery charging circuit provides a relatively even smaller constant current (e.g., about 100 milliamperes or so) to the battery without interruption. In this mode, the battery may not be charged but its power loss due to natural discharge is compensated. During all charging operations, the charge level of the battery is monitored so that, when the battery reaches its maximum charge level, the charging operation is terminated in order to prevent overcharging and damage of the battery. Exemplars of contemporary battery chargers are disclosed in U.S. Pat. Nos. 4,843,299 and 5,049,804 for *Universal Battery Charging System* issued to Hutchings, U.S. Pat. No. 5,168,205 for *Method And Apparatus For Charging A Battery In High AMP And Automatic Charging Modes* issued to Kan et al., U.S. Pat. No. 5,175,485 for *Apparatus For Controlling Charging Of A Storage Battery* issued to Joo, U.S. Pat. No. 5,241,259 for *Method And Apparatus For Rapidly Charging A Battery At High Temperature* issued to Patino et al., U.S. Pat. No. 5,411,816 for *Method And Apparatus For Determining Battery Characteristics* issued to Patino, U.S. Pat. No. 5,479,083 for *Non-Dissipative Battery Charger Equalizer* issued to Brainard, U.S. Pat. No. 5,541,492 for *Method For Charging A Multiple Voltage Electrochemical Cell* issued to Fernandez et al., U.S. Pat. No. 5,592,069 for *Battery Charger* issued to Dias et al., U.S. Pat. No. 5,637,981 for *Method For Charging A Secondary Battery And Charger Used Therefor Using Constant Current And Constant Voltage* issued to Nagai et al.

When a rechargeable battery is charged, it is heated due to its internal resistance. In particular, the battery charged at a fast charge mode produces large heat. The ambient temperature of the battery and the charging rate are inversely proportional, that is, the higher the ambient temperature, the lower the charging rate of the battery. Charging/discharging of the battery at high temperature may shorten its life span. The battery that normally has a charging rate of about 100% at room temperature may only have a charging rate of 60 to 70% at high temperature. In order to enhance the life span of batteries, a variety of charging control technologies which use battery temperature variations have been adopted by computer manufacturers. Unlike charging of a battery at room temperature, the charging operation is dependent upon the battery temperature when the charging operation is performed at high temperature. The charging current is normally interrupted before the battery is fully charged.

Recently, most personal computers available in the market use micro-processors (e.g, CPU) that contain internal operation speed of at least 150 MHZ. At that operation speed, the temperature of such a processor may rise to 90 to 100° C. when it is operating at maximum load which attributes to a rise in temperature in a battery pack. When the ambient temperature of the battery in the battery pack is high during the charging operation, the battery may not be effectively charged. However, most battery chargers only rely upon battery temperature to control the charging operation, charging of the battery may be stopped before it is fully charged. The failure to fully charge the battery can significantly shorten the portable operation time of personal computers. Recognizing the significance of ambient temperature during the charging operation, many up-to-date battery chargers such as disclosed in U.S. Pat. No. 5,055,763 for Electronic Batteiy Charger Device issued to Johnson et al., U.S. Pat. No. 5,568,040 for Charging Arrangement For The Time-Controlled Charging Of At Least One Rechargeable Cell issued to Krainer et al., U.S. Pat. No. 5,592,070 for Battery Charger Having A Temperature Sensor And A Rechargeable Battery Charging Method issued to Mino, U.S. Pat. No. 5,617,009 for Rechargeable Battery Charging Circuit Which Sets Supplemental Charging Capacity According To Ambient Temperature issued to Takao et al., incorporate a temperature sensor for sensing ambient temperature of the battery in order to better control the charging operation of the battery. While these battery chargers are capable of charging a rechargeable battery to a full charge, I believe that improvement can still be contemplated.

SUMMARY OF THE INVENTION

Accordingly, it is therefore an object of the present invention to provide a novel battery charging circuit of a battery pack capable of charging a rechargeable battery quickly with high charging efficiency.

It is also an object to provide a battery charging circuit of a battery pack having an ambient temperature detector responsive to the ambient temperature for controlling charging current to insure a fully charged rechargeable battery.

It is another object to provide a battery charging circuit of a battery pack usable for portable computers to fully charge a rechargeable battery with a succession of charge current in a staircase wave form in response to ambient temperature variations.

These and other objects of the present invention can be achieved by a battery charging circuit of a battery pack which comprises a battery switch connected between a regulated source of DC voltage and the battery; a current detection circuit for detecting intensity of charging current flowing from the DC voltage source through the battery switch to the battery and generating a charging current detection signal exhibiting a magnitude varying substantially linearly with the intensity of the charging current. A first controller having an input terminal enabled by a first control logic signal and a feedback terminal coupled to receive the charging current detection signal, is provided to control operation of the battery switch in accordance with a voltage level at the feedback terminal. A second controller having an input terminal enabled by a second control logic signal, is provided to control operation of the battery switch by varying the voltage level at the feedback terminal in accordance with the second control logic signal. A battery detection circuit is provided to detect a temperature of the battery and generate a battery temperature signal having a magnitude varying substantially linearly with the battery temperature. A third controller is provided to generate the first and second control logic signals in dependence upon the magnitude of the battery temperature signal. An ambient detection circuit is provided to detect an ambient temperature of said battery and generate at least two ambient temperature signals corresponding to at least two predetermined ambient temperature ranges respectively. A fourth controller is provided to control operation of the battery switch by varying the voltage level at the feedback terminal in response to the ambient temperature signals.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
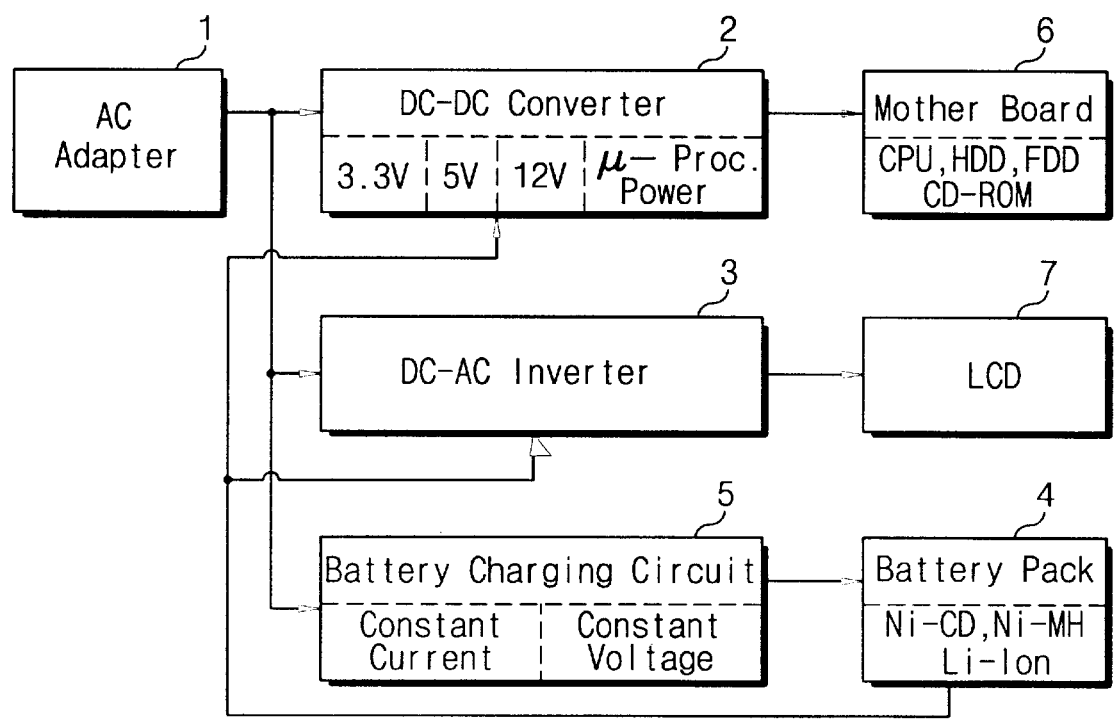
FIG. 1 is an exemplary schematic block diagram of a portable computer power supply system.

Referring now to the drawings and particularly to FIG. 1, which illustrates a typical power supply system for portable computers to be operated from a DC power source supplied from a rechargeable battery or an AC (alternating current) adapter. Referring to FIG. 1, the portable computer power supply system includes an AC adapter 1, a DC-DC converter 2, a DC-AC inverter 3, a battery pack 4, a battery charging circuit 5 for providing constant current and constant voltage for charging a rechargeable battery contained in the battery pack 4, a mother board 6 supporting a central processing unit (CPU), audio and video circuitry, a hard disk drive (HDD), a floppy disk drive (FDD), and a compact disk CD-ROM, and a liquid crystal display LCD 7. In general, the DC-DC converter 2 and the DC-AC inverter 3 are connected to the battery pack 4 while the AC adapter 1 is not in use.

The AC adapter 1 converts an AC voltage of about 100 to 240 volts to a stable DC (direct current) voltage of, for example, about 12 to 15 volts. The DC-DC converter 2 generates several converted DC voltages (e.g., 3.3 V, 5 V, 12 V, a supply voltage for a power management controller, etc.) necessary for the mother board 6 to operate the portable computer, using the DC source voltage supplied from the AC adapter 1 or the battery pack 4. The DC-AC converter 3 converts the regulated DC source voltage supplied from the AC adapter 1 or the battery pack 4 into an AC voltage of about 500 V or so, and the AC voltage is provided to cold cathode fluorescent lamps of the LCD 7.

Figure 2:
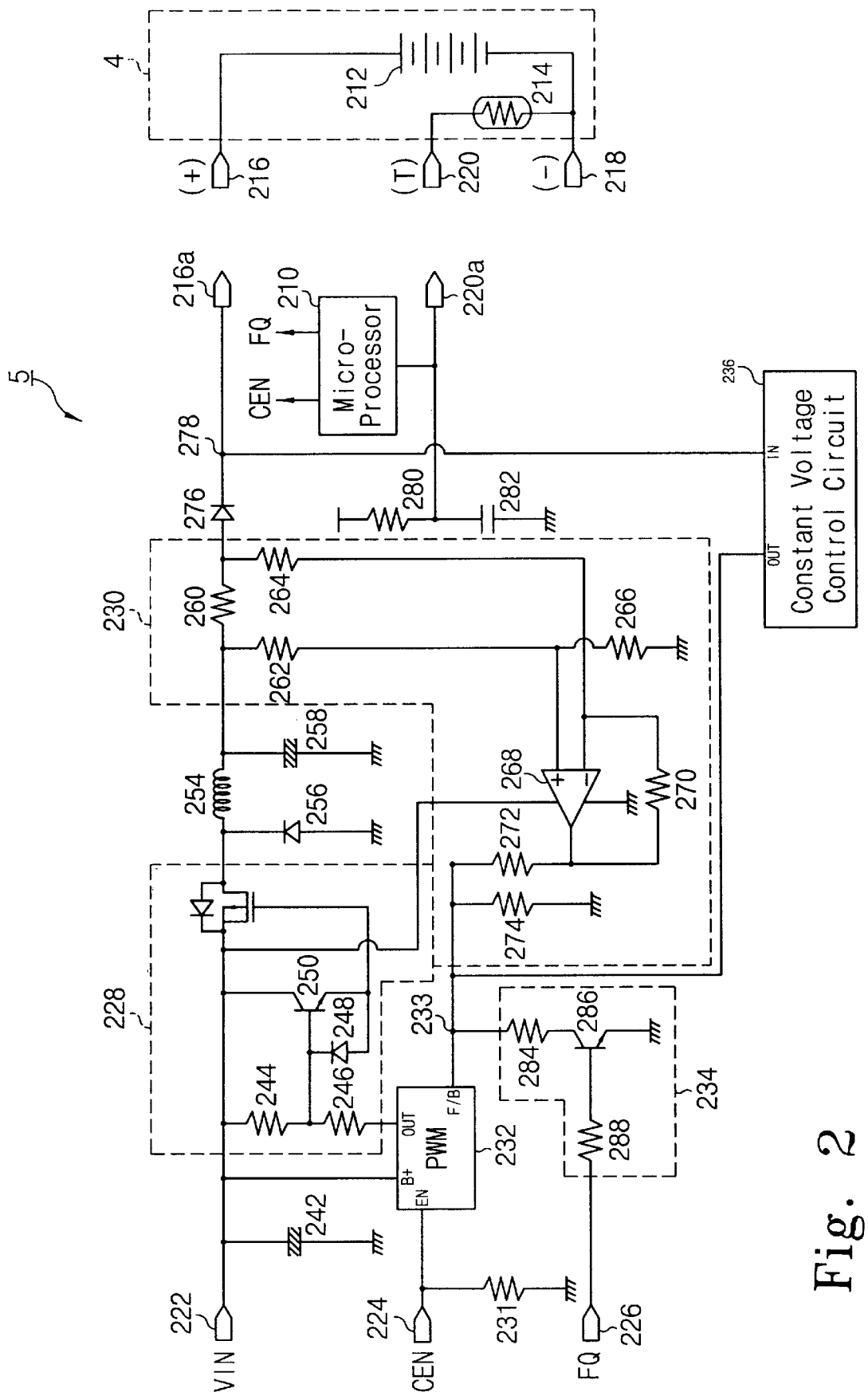
FIG. 2 is a detailed circuit diagram of a battery charging circuit for charging rechargeable batteries.

FIG. 2 illustrates a typical battery charging circuit for charging a rechargeable battery for portable computers. Referring to FIG. 2, a battery pack 4 contains a single or a series of rechargeable battery 212, a thermistor 214, a positive terminal 216, a negative terminal 218 and a temperature terminal 220. When the battery pack 4 is inserted into the portable computer, the terminals 216, 218 and 220 of the battery pack 4 are connected to corresponding terminals 216a, 218a and 220a of the battery charging circuit, respectively. In the battery charging circuit, a terminal 222 is provided with a regulated DC voltage.

A microprocessor 210 for controlling the charging of the battery 4 has an input port connected to a battery temperature detecting circuit constructed of a thermistor 214, a resistor 280 and a capacitor 282. When the battery pack 4 is necessary to be charged at quick charge mode, the microprocessor 210 generates a control logic signal FQ of a high level. The microprocessor 210 further generates another control logic signal CEN of a low level when the charging of the battery 4 is required to be completed, thereby disabling the charging circuit.

A switch circuit 228 has resistors 244 and 246, a diode 248, an NPN bipolar transistor 250 and a MOS power transistor 252. A charging current detection circuit 230 detects intensity of the charging current flowing from the DC voltage source through the switch circuit 228 to the battery pack 4 and provides a charging current detection signal in accordance with the detected intensity of the charging current to a feed-back terminal (F/B) of a pulse width modulation (PWM) controller IC 232. The controller 232 is enabled by the control logic signal CEN from the microprocessor 210 and controls ON/OFF time of the power transistor 252 in accordance with the voltage level on the node 233.

A quick charging control circuit 234 enables the battery pack 4 to be charged at a quick charge rate by varying voltage level on the node 233 in response to the control signal FQ. When the control signal FQ is at low level, a transistor 286 within the control circuit 234 is turned off, thereby the voltage level on the node 233 does not changed. The battery charging circuit, under this condition, is operated at a fast charge mode. On the contrary, when the control signal FQ is at a high level, the transistor 286 is turned on. Thus the voltage level on the node 233 considerably drops down. In this case, the duty cycle of the output signal OUT of the PWM controller 232 is decreased so that the battery charging circuit is operated at a quick charge mode where the battery is charged with less charging current than the fast charging mode.

A constant voltage control circuit 236 allows the battery 4 to be charged with a constant charging voltage. This circuit is provided to charge Li-Ion batteries that need to be charged with a constant current in the early period of charging operation and charged with a constant voltage in the late period of the charging operation.

Figure 3:
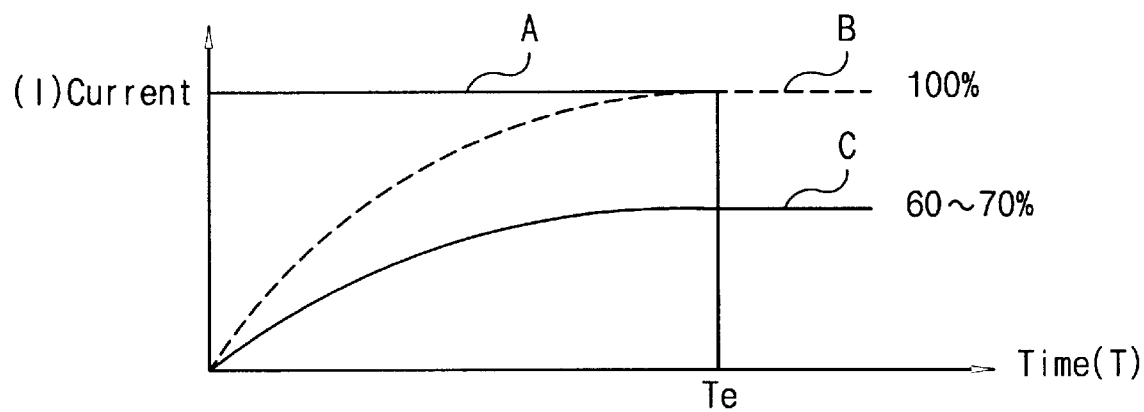
FIG. 3 is a schematic representation of charging rates of a rechargeable battery in response to ambient temperature variations and a waveform of the charging current in accordance with contemporary battery charging technologies.

FIG. 3 schematically shows the charging rates of the battery associated with ambient temperature variations and the waveform of the charging current, in accordance with the contemporary battery charging technologies. In FIG. 3, a reference characters A, B and C respectively indicate charging current, charging rates at room temperature (about 25° C.) and at a temperature higher than room temperature. In this specification, the charging rate indicates the proportion of the substantially charged capacity of a battery versus its fullest charging capacity.

As is well known, when a rechargeable battery is charged, it is heated up due to its internal resistance. In particular, the battery charged at a fast charge mode produces large heat. The greater the ambient temperature, the lower the charging rate of the battery becomes. Charging/discharging of the battery at a high temperature may shorten its life span. The battery normally has a charging rate of about 100% at room temperature. However, at high temperature, the charging rate of the battery is only at approximately 60 to 70%, as shown in FIG. 3.

In order to enhance the life span of batteries, a variety of charging control technologies which use battery temperature variations have been adopted by computer manufacturers. Unlike charging of a battery at room temperature, the charging operation is dependent upon the battery temperature when the charging operation is performed at high temperature. The charging current is normally interrupted before the battery is fully charged.

Recently, most personal computers available in the market use micro-processors (e.g, CPU) that contain internal operation speed of at least 150 MHZ. At that operation speed, the temperature of such a processor may rise to 90 to 100° C. when it is operating at maximum load which attributes to a rise in temperature in a battery pack. When the ambient temperature of the battery in the battery pack is high during the charging operation, the battery may not be effectively charged. However, most battery chargers only rely upon battery temperature to control the charging operation, charging of the battery may be stopped as shown in FIG. 3 before it is fully charged. The failure to fully charge the battery can significantly shorten the portable operation time of personal computers.

Figure 4:
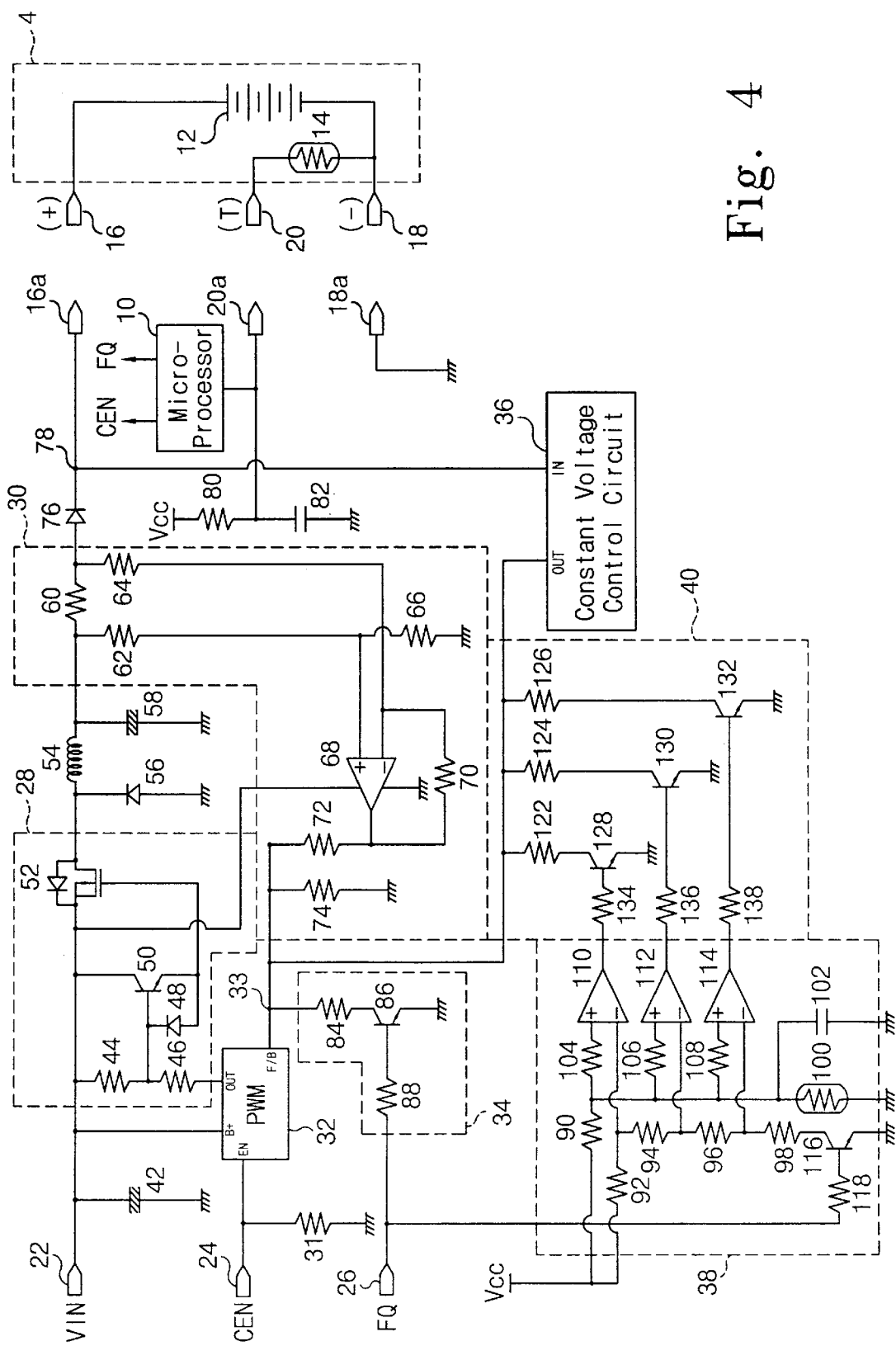
FIG. 4 is a detailed circuit diagram of a novel battery charging circuit constructed according to the principles of the present invention.

Turning now to FIG. 4 which illustrates a novel battery charging circuit 5 of a battery pack 4 usable for portable computers for controlling charging current to charge a rechargeable battery to a full charge in response to ambient temperature variations constructed according to the principles of the present invention. As shown in FIG. 4, a battery charging circuit 5 of a preferred embodiment includes a microprocessor 10, a battery switch circuit 28, a charging current detection circuit 30, a pulse width modulation (PWM) circuit 32, a quick charging controller 34, a constant voltage control circuit 36, an ambient temperature detection circuit 38, and a charging current control circuit 40.

A battery pack 4 contains a rechargeable battery 12, a temperature-sensitive resistor 14, a positive terminal 16, a negative terminal 18 and a temperature terminal 20. The temperature-sensitive resistor 14 can be a thermistor or other element proximal to the cells 12 inside the battery pack 4. When the battery pack 4 is inserted into a portable device such as a personal computer, the terminals 16, 18 and 20 of the battery pack 4 are connected to corresponding terminals 16a, 18a and 20a of the battery charging circuit, respectively. In the battery charging circuit, a terminal 22 is provided with a DC voltage (e.g., 9.6 volts for a portable personal computer) regulated by an external voltage source (not shown) such as a voltage regulator.

Microprocessor (or microcomputer) 10 has an input port connected to a battery temperature detection circuit which is made up of the temperature-sensitive resistor 14 inside the battery pack 4, a resistor 80 and a capacitor 82. The microprocessor 10 generates a control logic signal FQ of high level when the temperature of the battery pack 4 reaches a first fixed threshold temperature in which the battery pack 4 is required to be charged at quick charge mode. The microprocessor 10 further generates another control logic signal CEN of low level when the battery temperature reaches a second fixed threshold temperature in which the battery pack 4 is required to terminate the charging.

Both the battery switch circuit 28 and the charging current detection circuit 30 are disposed on current path between terminals 22 and 16a. Further, on the current path, capacitors 42 and 58, an inductor 54 and a diode 56 are provided to remove noise. The switch circuit 28 has resistors 44 and 46, a diode 48, an NPN bipolar transistor 50 and a MOS power transistor 52. The charging current detection circuit 30 includes resistors 60, 62, 64, 66, 70, 72, and 74 and a differential amplifier 68. The circuit 30 detects intensity of the charging current flowing from the DC voltage source through the switch circuit 30 to the battery pack 4 and provides a charging current detection signal having a magnitude which varies almost linearly in association with the detected intensity of the charging current to a feed-back terminal (F/B) of a PWM controller IC 32. The controller 32 is enabled by the control logic signal CEN from the microprocessor 10 and controls ON/OFF time of the power transistor 52 of the battery switch circuit 28 depending on the level of the voltage on the node 33, i.e., the terminal F/B of PWM controller 32. The battery switch circuit 28, the current detecting circuit 30, and the PWM controller 32 supply a variable amount of charging current to the battery pack 4 in accordance with the control of the microprocessor 10 associated with temperature variations of the battery pack 4.

A quick charging control circuit 34 having resistors 84 and 88 and a transistor 86 enables the battery 4 to be charged at quick charge rate by varying voltage level on the node 33 in response to the control logic signal FQ from the microprocessor 10. When the control signal FQ is at a low level, the transistor 86 is turned off, thereby the voltage level on the node 33 does not changed. At this time, duty cycle of an output pulse signal OUT of the PWM controller 32 is controlled only by the output signal of the charging current detection circuit 30. The battery charging circuit, under this condition, is operated at a fast charge mode. When the control signal FQ is high, on the contrary, the transistor 86 is turned on. Thus the voltage level on the node 33 considerably drops down. In this case, the duty cycle of the output signal OUT of the PWM controller 32 is decreased, so that the battery charging circuit is operated at a quick charge mode where the battery is charged with less charging current than the fast charging mode.

A constant voltage control circuit 36 allows the battery 4 to be charged with a constant charging voltage. This circuit 36 provides for the charging of Li-Ion batteries that need to be charged with a constant current in the early period of charging operation and charged with a constant voltage in the late period of the charging operation.

An ambient temperature detection circuit 38 includes resistors 90, 92, 94, 96, 98, 104, 106, 108 and 118, a temperature-sensitive resistor 100 such as a thermistor, comparators 110, 112 and 114, and a transistor 116. The circuit 38 detects the ambient temperature, that is, a temperature of a portable computer operated by the battery pack 4, and generates detection signals corresponding to the ambient temperature ranges which are decided by the respective resistance values of the resistors 92 to 98. The resistors 92 to 98 are connected in series between a supply voltage Vcc (e.g., the same voltage that applied to the microprocessor 10) and ground voltage. The contacts of the resistors 92 to 98 are connected with inverting terminals of the comparators 110, 112 and 114, respectively. The resistors 104, 106 and 108, which are connected to the temperature-sensitive resistor 100 having a negative temperature coefficient and in parallel to each other, are connected to non-inverting terminals of the comparators 110 to 114 respectively. The supply voltage Vcc is divided by a voltage divider comprised of the resistors 92 to 98. The transistor 116 and the resistor 118 control the operation of the ambient temperature detection circuit 38 depending on the control signal FQ from the microprocessor 10. More specifically, the transistor 116 and the resistor 118 enable the detection circuit 38 when the control signal FQ is high, but disable the circuit 38 when the control signal FQ is low. While the control signal FQ is being activated, the transistor 116 enables the ambient temperature detection circuit 38 for detecting an ambient temperature of the battery pack.

The reference voltages applied to the inverting terminals of the comparators 110, 112 and 114 are respectively represented by $V_{110}$, $V_{112}$ and $V_{114}$, and also the resistance values of the resistors 92 to 98 are represented by $R_{92}$ to $R_{98}$, respectively. The reference voltages $V_{110}$, $V_{112}$ and $V_{14}$ are given by the following expressions.

$$V_{110} = V_{cc} \times \frac{R_{94} + R_{96} + R_{98}}{R_{92} + R_{94} + R_{96} + R_{98}}$$

$$V_{112} = V_{cc} \times \frac{R_{96} + R_{98}}{R_{92} + R_{94} + R_{96} + R_{98}}$$

$$V_{114} = V_{cc} \times \frac{R_{98}}{R_{92} + R_{94} + R_{96} + R_{98}}$$

If the ambient temperature (i.e., device temperature) increases bit by bit, the resistance of the temperature-sensitive resistor 100 decreases gradually, thus reducing the voltages on the noninverting terminal of the comparators 110, 112 and 114.

In this embodiment, the ambient temperature is classified into a room temperature (about 25° C.) and three reference temperatures higher than the room temperature. At the room temperature, the comparators 110, 112 and 114 all generate first to third ambient temperature detection signals of high levels. If the ambient temperature increases gradually to reach a first reference temperature (e.g., about 40° C. or so), the voltage level on the non-inverting terminal of the comparator 110 becomes less than that on the inverting terminal thereof. The comparator 110 then generates the first ambient temperature detection signal of low level. In succession, if the ambient temperature further increases to reach a second reference temperature (e.g., about 50° C. or so), the voltage level on the non-inverting terminal of the comparator 112 becomes less than that on the inverting terminal thereof, to say nothing of the comparator 110. Accordingly, the comparators 110 and 112 generate the first and second ambient temperature detection signals of low levels respectively. Furthermore, if the ambient temperature increases to reach a third reference temperature (e.g., about 60° C. or over), the voltage levels on the non-inverting terminals of the all comparators 110, 112 and 114 become less than those on the inverting terminals thereof. As a result, the all comparators 110, 112 and 114 respectively generate the ambient temperature detection signals of low levels. In this arrangement, the resistors 92 to 98 are directly connected between the supply voltage Vcc and the ground voltage without the transistor 116.

Figure 5:
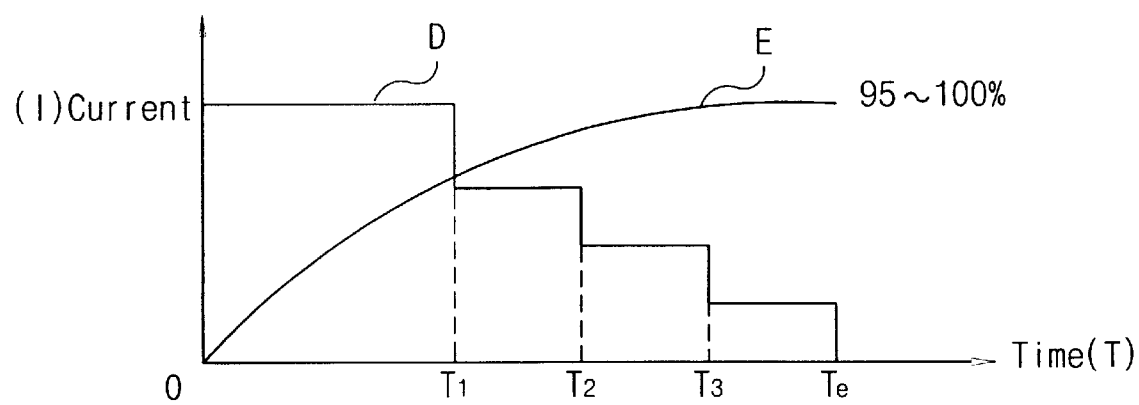
FIG. 5 is a schematic representation of charging rates of a rechargeable battery in response to ambient temperature variations and a waveform of the charging current in accordance with the principles of the present invention.

The charging current control circuit 40 having resistors 122, 124, 126, 134, 136 and 138, and transistors 128, 130 and 132 controls the amount of the charging current in response to the ambient temperature detection signals from the detection circuit 38. The control circuit 40 controls the voltage level on the node 33 (i.e., the terminal F/B of the PWM controller 33) to be increased depending on the increment of the ambient temperature, thus making the charging current to be reduced. At the room temperature, all of the transistor 128, 130 and 132 are turned on since the comparators 110, 112 and 114 generate the first to third ambient temperature detection signals of high levels. Therefore, as shown in FIG. 5, a normal charging current D for the fast charging then flows through the current path to the battery pack 4.

If the ambient temperature increases little by little so as to reach the first reference temperature at time T1, the transistor 128 is turned off because the comparator 110 generate the first detection signal of a low level. This causes the increase of the voltage level on the node 33, so that the charging current is decreased.

When the ambient temperature increases in succession to reach the second reference temperature at time T2, the transistors 128 and 130 are turned off since the comparators 110 and 112 generate the first and second ambient temperature detection signals of low levels. This results in the more decrease of the charging current. Further, when the ambient temperature reaches the second reference temperature at time T3, all of the transistors 128, 130 and 132 are turned off since the all comparators 110, 112 and 114 generate the first to third ambient temperature detection signals of low levels. Thus, the charging current is still more decreased.

As described above, the higher the ambient temperature, the lower charging current in a staircase-wave form becomes so as to allow the temperature of the battery pack 4 not to be increased substantially. This compensation of the ambient temperature and the battery temperature results in the improved charging rate E of 95 to 100%.

Thereafter, either when the battery pack 4 has been charged up to its fullest charging capacity or when the magnitude of the battery temperature detection signal from the battery temperature detection circuit 14, 80 and 82 is above a fixed threshold value, the microprocessor 10 disables the PWM controller 32 to cut off the charging current to the battery pack 4.

While there have been illustrated and described what are considered to be preferred embodiments of the present invention, it will be understood by those skilled in the art that various changes and modifications may be made, and equivalents may be substituted for elements thereof without departing from the true scope of the present invention. For example, the temperature sensitive resistor can be any element other than a thermistor whose characteristics vary predictively with temperature. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A battery charging circuit for charging a rechargeable battery, comprising:
    first means for supplying a variable amount of charging current to said battery in response to a first control logic signal;
    second means for controlling the amount of the charging current in response to a second control logic signal;
    third means for detecting a temperature of said battery and generating a first detection signal having a magnitude which varies substantially linearly with the battery temperature;
    fourth means for generating the first and second control logic signals in dependence upon the magnitude of the first detection signal;
    fifth means for detecting an ambient temperature of said battery and generating at least two second detection signals corresponding to at least two predetermined ambient temperature ranges respectively; and
    sixth means for controlling the amount of the charging current in response to the second detection signals.

2. The battery charging circuit of claim 1, wherein said sixth means controls the charging current gradually to be decreased in staircase-wave form when the ambient temperature is increased above a predetermined temperature.

3. The battery charging circuit of claim 1, wherein said fourth means disables said first means when the magnitude of the first detection signal is above a predetermined threshold.

4. The battery charging circuit of claim 1, further comprising seventh means for charging said battery with a predetermined constant voltage.

5. The battery charging circuit of claim 1, wherein said fifth means is enabled by the second control logic signal.

6. The battery charging circuit of claim 1, wherein said battery charging circuit is incorporated into a portable computer.

7. A battery charger of a battery pack for charging a rechargeable battery, comprising:
    a battery switch connected between a regulated source of DC voltage and said battery;
    a current detection circuit for detecting intensity of charging current flowing from said DC voltage source through said battery switch to said battery and generating a charging current detection signal exhibiting a magnitude varying substantially linearly with the intensity of the charging current;
    a first controller having an input terminal enabled by a first control logic signal and a feedback terminal coupled to receive said charging current detection signal, for controlling operation of said battery switch in accordance with a voltage level at said feedback terminal;
    a second controller having an input terminal enabled by a second control logic signal, for controlling operation of said battery switch by varying the voltage level at said feedback terminal in accordance with said second control logic signal;
    a battery detection circuit for detecting a temperature of said battery and generating a battery temperature signal having a magnitude varying substantially linearly with the battery temperature;
    a third controller for generating the first and second control logic signals in dependence upon the magnitude of the battery temperature signal;
    an ambient detection circuit for detecting an ambient temperature of said battery and generating at least two ambient temperature signals corresponding to at least two predetermined ambient temperature ranges respectively; and
    a fourth controller for controlling operation of said battery switch by varying the voltage level at said feedback terminal in response to the ambient temperature signals.

8. The battery charging circuit of claim 7, wherein said ambient detection circuit comprises a temperature-sensitive resistor having a first end connected to a supply voltage and a second end connected to a ground voltage, a reference voltage generator for generating at least two reference voltages, and at least two comparators for comparing a temperature-dependent voltage on said first end of said temperature-sensitive resistor to the reference voltages to generate the ambient temperature signals.

9. The battery charging circuit of claim 7, further comprising means for enabling operation of said ambient detection circuit, when the second control logic signal is activated.

10. The battery charging circuit of claim 7, wherein said fourth controller comprises at least two resistors connected to said node and in parallel each other, and at least two switch elements each connected between said corresponding resistor and the ground voltage, for being turned on/off in response to the ambient temperature signals.

11. The battery charging circuit of claim 7, wherein said fourth controller controls the charging current gradually to be decreased in staircase-wave form when the ambient temperature of the battery reaches above room temperature.

12. The battery charging circuit of claim 7, wherein said third controller disables said first controller when the magnitude of the battery temperature signal reaches a predetermined threshold.

13. The battery charging circuit of claim 7, further comprising means for charging said battery with a predetermined constant voltage.

14. The battery charging circuit of claim 9, further comprising means for charging said battery with a predetermined constant voltage.

15. The battery charging circuit of claim 7, further incorporated into a portable computer.

16. A battery charging circuit for charging a rechargeable battery, comprising:

means for supplying a charging current to said battery;

means for controlling the charging current by means of a temperature of said battery; and means for controlling the charging current gradually to be decreased in a staircase-wave form when an ambient temperature reaches at least two predetermined temperature ranges higher than room temperature.

17. The battery charging circuit of claim 15, further incorporated into a portable computer.

18. A battery charger for charging a rechargeable battery, comprising:

a battery switch connected between a regulated power source and said battery;

a current detection circuit for detecting intensity of charging current flowing from said power source through said battery switch to said battery, and generating a charging current detection signal exhibiting a magnitude varying substantially linearly with the intensity of the charging current;

a battery detection circuit for detecting a temperature of said battery and generating a battery temperature signal having a magnitude varying substantially linearly with the battery temperature;

an ambient detection circuit for detecting an ambient temperature of said battery and generating at least two ambient temperature signals corresponding to at least two predetermined ambient temperature ranges respectively; and controller means for responding to the charging current detection signal, the battery temperature signal, and the ambient temperature signals to control operation of said battery switch.

19. The battery charging circuit of claim 18, further comprised of said ambient detection circuit comprising a temperature-sensitive resistor disposed between a supply voltage and a ground voltage, a reference voltage generator for generating at least two reference voltages, and at least two comparators for comparing the supply voltage to the reference voltages to generate the ambient temperature signals.

20. The battery charging circuit of claim 18, further comprised of said controller means controlling the charging current gradually to be decreased in staircase-wave form when the ambient temperature of the battery reaches above room temperature.

21. The battery charging circuit of claim 19, further comprised of said controller means controlling the charging current gradually to be decreased in staircase-wave form when the ambient temperature of the battery reaches above room temperature.

22. The battery charging circuit of claim 21, further incorporated into a portable computer system.

\* \* \* \* \*